Oct. 1, 1963        D. E. HARRIS        3,105,950
BANDWIDTH COMPRESSION SYSTEM
Filed April 19, 1960        2 Sheets-Sheet 1
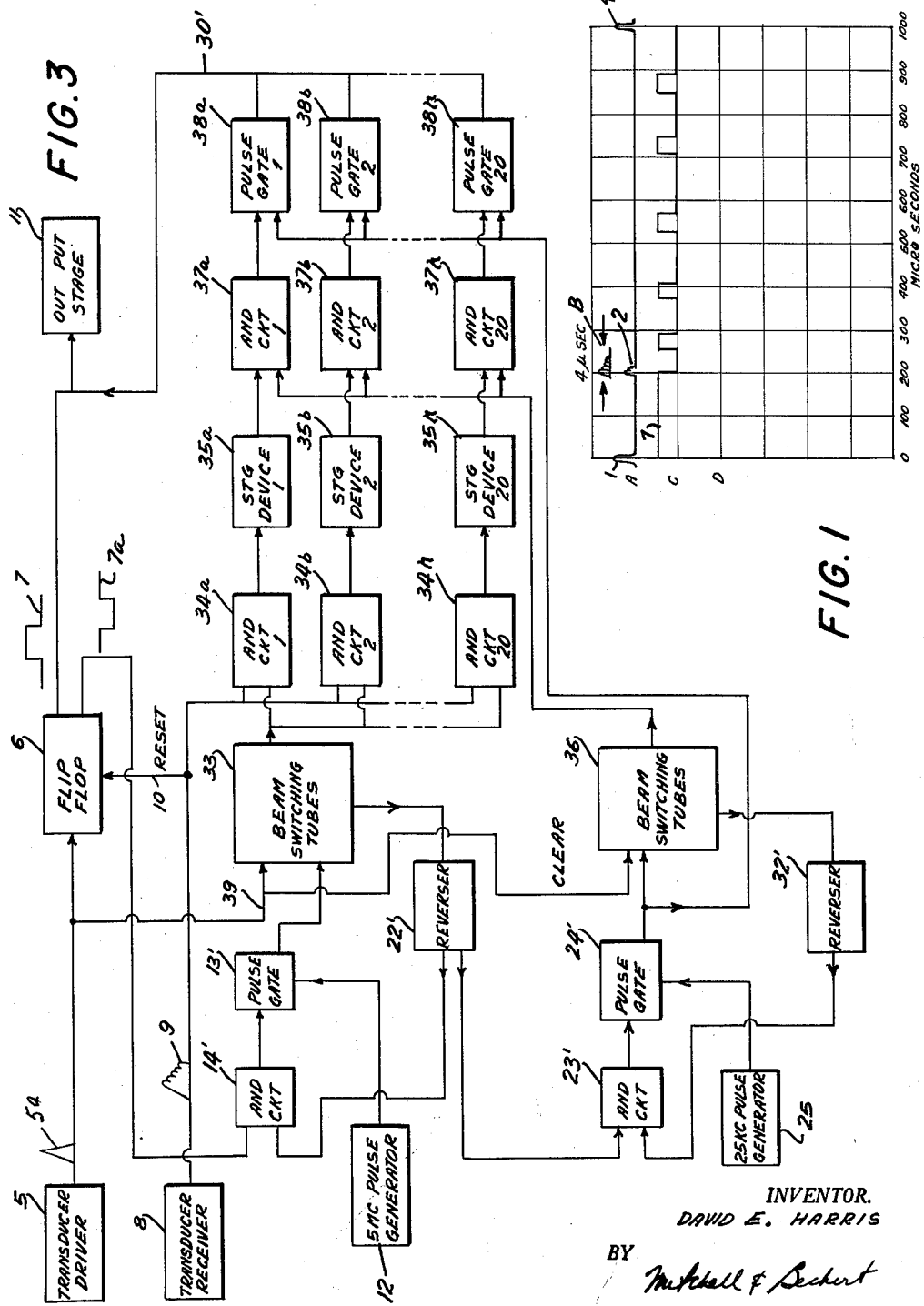
INVENTOR.
DAVID E. HARRIS
BY
Mitchell & Bechert
ATTORNEYS

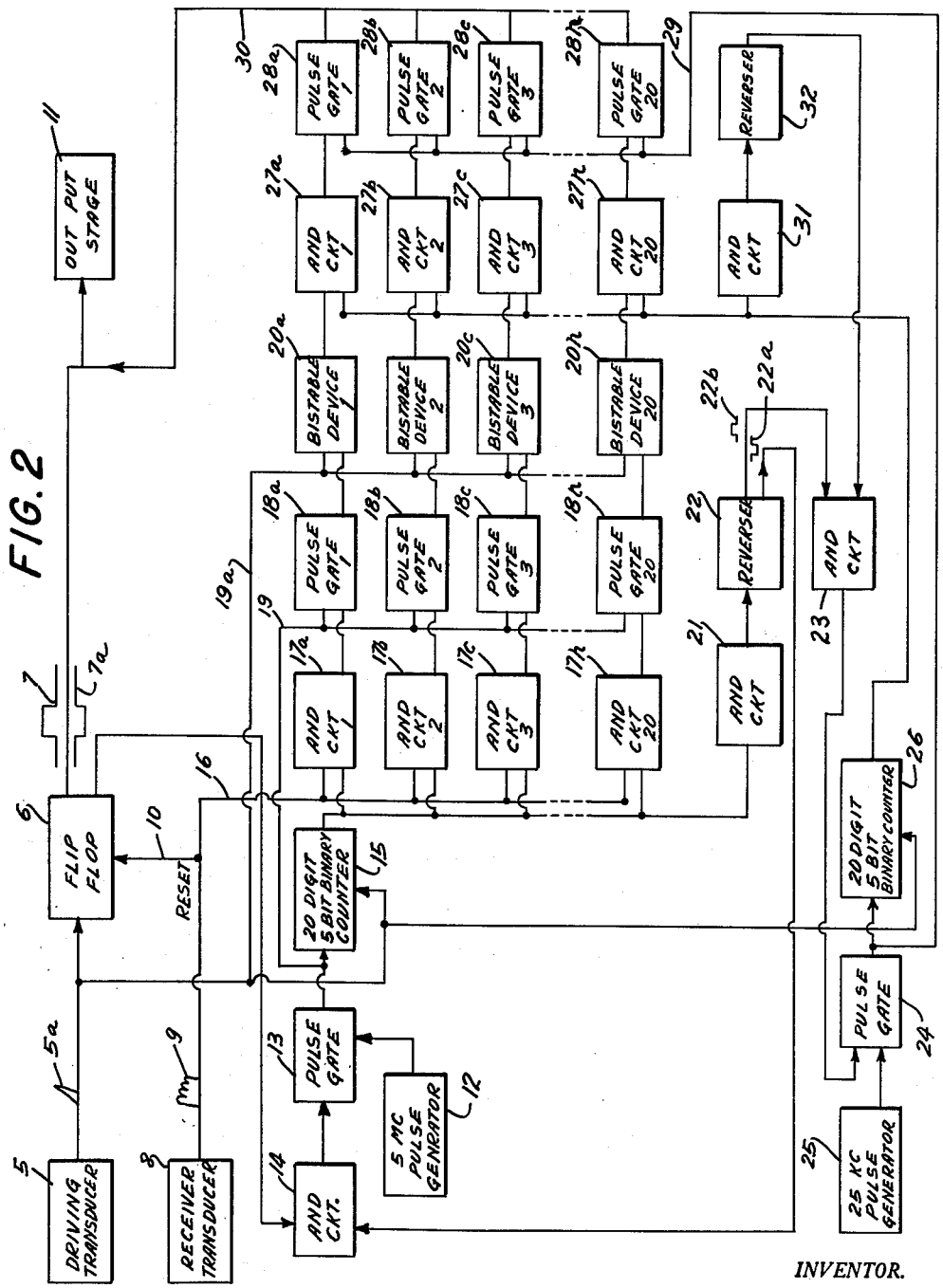）

United States Patent Office 3,105,950
Patented Oct. 1, 1963

3,105,950
BANDWIDTH COMPRESSION SYSTEM
David E. Harris, Boalsburg, Pa., assignor to HRB-Singer, Inc., State College, Pa., a corporation of Delaware
Filed Apr. 19, 1960, Ser. No. 23,288
13 Claims. (Cl. 340—1)

This invention relates to bandwidth compression systems and more particularly to bandwidth compression systems for use in oil well ultrasonic corrosion detector devices.

It is possible to determine the degree of corrosion and condition of an oil well casing, while it remains in its operational environment, by utilizing an ultrasonic transducer which is lowered into the casing. A pulse is propagated from the transducer and the echo signals returned by the oil well casing are utilized to determine its condition. The time delay between the transmission of the driving pulse and the reception of the first echo or reflected pulse is indicative of the distance between the transducer and the inner wall of the casing and thus may be utilized to determine the location of the transducer in the casing. The time delay between the reception of subsequent pulses is indicative of the condition of the wall of the casing.

In order properly to use the information obtained by the transducer, it must be relayed to computing or display units at the surface. Obviously, it is desirable to obtain information about the entire length of the casing and for this purpose the transducer continues to operate as it is rotated and moved along the length of the casing. A single conductor cable is commonly used for electrical testing in oil wells and it is, of course, desirable to utilize this cable for the transmission of the transducer information. However, this cable has a relatively narrow bandwidth transmission characteristic.

Since the primary information about the condition of the casing is contained in the time difference between two to six pulses in the echo signal, the necessary resolution must be in the order of a fraction of a microsecond. Thus, because the cable has a limited or narrow frequency transmission characteristic, and the information must be transmitted over a relatively broad frequency band to obtain the required degree of resolution, some form of bandwidth compression is essential. However, it is also necessary to transmit the time difference between the propagation of the driving pulse and the reception of the first echo so that the position of the transducer within the casing may be determined. This time difference is generally a much longer period than the time between the pulses in the echo or primary information. Thus, if a bandwidth compression system is utilized to obtain the resolution required of the primary information, the repetition rate of obtained information would be extremely slow because of the time period occupied by the secondary information and would require an extremely long period of time to fully sample the entire casing.

One of the objects of this invention, therefore, is to provide a bandwidth compression system for use in oil well testing.

Another object of this invention is to provide a bandwidth compression system for use in transmitting the information contained in the echo signals returned by the target of propagated energy.

A further object of this invention is to provide a bandwidth compression system having two degrees of resolution.

One of the features of this invention is the separation of the primary and secondary information which is achieved by directly transmitting the secondary information as a singular rectangular pulse whose width is equal to the time between transmission of the driving pulse and the reception of the first echo pulse, and the storing of the primary information as it is received, and retransmitting the primary information at a slower rate following the transmission of the secondary information retangular pulse.

The above-mentioned and other features and objects of my invention will become more apparent by reference to the following description taken in conjunction with the accompanying drawings, in which:

FIG. 1 is a graphic illustration helpful in the explanation of the invention;

FIG. 2 is a schematic diagram in block form of one embodiment of the invention; and FIG. 3 is a schematic diagram in block form of an alternate embodiment of the invention.

Referring to FIG. 1, curve A represents the pulse information emitted and received at the transducer disposed in the oil well casing and is seen to comprise a driving pulse 1 followed after a time interval by the received signal 2 consisting of a group of reflected pulses. The received signal 2 is graphically illustrated in curve B, FIG. 1. The secondary information, i.e., the time delay between the transmission of driving pulse 1 and the reception at the transducer of the group of pulses 2, is indicative of the distance between the transducer and the inner wall of the oil well casing.

This time delay between the propagation of the driving pulse and the reception of the first echo may be as great as 200 microseconds for an oil well casing having a twelve inch inner diameter. Assuming a ⅜ inch casing wall thickness, the time for the transmission of the driving pulse through the wall and the echo return, during which time up to six pulses must be resolved, is in the order of four microseconds. In order to obtain sufficiently detailed information from the primary information about the condition of the casing, it is necessary to resolve twenty incremental units of time within the group of echo pulses representing the wall thickness; and thus, the required resolution for the primary information is in the order of two tenths of a microsecond. However, it has been found that a resolution in the order of fifteen microseconds for the secondary information results in an adequate degree of accuracy in order to determine the location of the transducer relative to the casing wall.

In order to obtain sufficient samplings of the oil well casing condition it is desirable to emit driving signals at a pulse repetition rate of about 1000 per second. Thus, 1000 microseconds after the transmission of driving pulse 1 a second driving pulse 4 is emitted from the transducer. As shown in curve A, if a period of approximately 200 microseconds is required for the reception of the primary and the secondary information and if the secondary information is transmitted to the surface within its maximum time increment of 200 microseconds, a period of 800 microseconds is available for the retransmission of the primary information at a rate substantially slower than it is received and still permit a sampling at the rate of 1000 per second. By transmitting the secondary information within its maximum time increment and utilizing the slower rate for the primary information retransmission, the required bandwidth compression is achieved while the necessary high degree of resolution is provided.

Referring to FIG. 2, one embodiment of a bandwidth compression system in accordance with the principles of this invention, to achieve two degrees of resolution, comprises a driving transducer 5 which emits a driving pulse 5a. The emission of the driving pulse 5a actuates the binary circuit or flip-flop 6 which in turn initiates the generation of a secondary information pulse 7, having a given polarity.

The receiver portion of the transducer 8 detects the returned echo pulses and couples the received signals 9 over line 10 to reset the flip-flop circuit 6 and terminate the secondary information pulse 7. The width of the pulse 7 is indicative of the time delay between the transmission of the driving pulse 5a and the reception of the echo signals 9, and represents the distance between the transducer and the inner wall of the oil well casing being sampled. This secondary information pulse 7 is coupled to the output stage 11 for transmission over the narrow frequency bandwidth cable to the surface.

In order to compress the bandwidth of the primary information, a relatively high frequency 5 megacycle (mc.) pulse generator 12 has its output coupled to the pulse gate 13. The inverted output pulse 7a of the flip-flop circuit 6 is coupled to a coincidence or AND circuit 14 which opens the pulse gate 13 coupling the 5 mc. pulses from the generator 12 to the digit "5 bit" binary counter 15. The output of the binary counter 15 is coupled to the AND circuits 17a, 17b, 17c, . . . in such manner as to enable each AND circuit in sequence as counter 15 steps through its 20 state counting cycle. AND circuit 1 (17a) is enabled in the first step of the counting cycle, AND circuit 2 (17b) is enabled in the second step of the counting cycle . . . and AND circuit 20 (17h) is enabled in the twentieth step of the counting cycle. Each AND circuit remains enabled only during its corresponding step of the counting cycle. In FIG. 2, the connection between counter 15 and AND circuits 17a . . . 17h is represented by a single line, but it will be apparent to those skilled in the art that the single line represents ten output conductors, two from each stage of counter 15. It will also be apparent to those skilled in the art that the above described sequential gate enabling cycle is achieved by coupling the appropriate combination of conductors to each AND gate in accordance with the code of counter 15. If a straight binary code is employed, AND circuit 1 (17a) would be coupled to the true output of the first counter stage and to the complement output of the other four counter stages, AND circuit 2 (17b) would be coupled to the true output of the second counter stage and to the complement output of the other four counter stages, AND circuit 3 (17c) would be coupled to the true output of the first and second counter stages and to the complement output of the other three stages, and so on in accordance with the binary counting sequence of counter 15. The echo signals 9 received by the transducer 8 are also coupled to the AND circuits 17 over line 16. Thus, if a pulse is coupled from the transducer receiver 8 at the time that an AND circuit 17 is opened by the output of the binary counter 16, then a signal is coupled to its associated pulse gate 18. The 5 mc. pulse output from gate 13 is also coupled over line 19 to each of the storage pulse gates 18. As the pulse gate 18 is opened by an output from AND circuits 17, a 5 mc. pulse is gated to the bistable devices or flip-flop circuits 20. Each received echo pulse is thus utilized to alter a characteristic of the bistable storage device 20. The particular storage device 20 which stores an indication of a received pulse is determined by the 5 mc. switching arrangement and is indicative of the time position of the particular received pulse.

In order to achieve the degree of resolution necessary, twenty storage devices are utilized, with pulses from the 5 mc. generator 12 being gated under control of the 20 digit 5 bit binary counter 15 into the storage devices 20 associated with the increment of time at which a reflected pulse signal is received by the transducer 8.

When the 20 digit 5 bit binary counter 15 completes its cycle and thus indicates that all the storage devices 20, or in other words all the increments of time, have been sampled, an indication of this is coupled to the AND circuit 21 which has its output coupled to a reverser circuit 22, i.e., a Schmitt trigger circuit which provides a dual output from the single pulse input signal. It will be understood by those skilled in the art that the single line leading to AND circuit 21 in FIG. 2 represents a plurality of conductors which indicate the last step in the cycle of binary counter 15. One of the dual output pulses 22a from the reverser circuit 22 closes the gate 13 at the output of the 5 mc. generator 12 through the AND circuit 14. Simultaneously, the second pulse 22b from the reverser circuit 22 is coupled to the AND circuit 23 whose output opens the pulse gate 24 causing the relatively low frequency pulses from the 25 kilocycles (kc.) pulse generator 25 to be coupled to the second 20 digit 5 bit binary counter 26.

The output of the 5 bit binary counter 26 opens each AND circuit 27 sequentially at the 25 kc. rate determined by the pulse generator 25. AND circuits 27 are coupled to counter 26 in the same manner described above for AND circuits 17 and counter 15 to produce sequential opening of AND circuits 27. If when an AND circuit 27 is opened, its associated bistable device 20 has a signal stored therein, the signal is passed to the pulse gate 28. Each pulse gate 28 is opened at the 25 kc. rate by signals coupled from the pulse gate 24 over line 29. The output of the pulse gates 28 are coupled over line 30 to the output stage 11 for transmission over the narrow frequency band cable to the surface.

When the 5 bit binary counter 26 has opened all 20 AND circuits 27 in sequence, a signal coupled to AND circuit 31 activates the reverser 32 to transmit a pulse to AND circuit 23 which closes the pulse gate 24 and ends the operating cycle of the system. The driving pulse is coupled over line 19a to clear the bistable storage devices 20 and to reset binary counters 15 and 26. When binary counters 15 and 26 are reset, they reset the corresponding reverser circuits, which are responsive to the state of the counters. Reverser circuit 22 enables AND circuit 14 and disables AND circuit 23. Therefore, pulse gate 13 will open when flip-flop 6 is reset by the first received pulse, and pulse gate 24 will open when reverser circuit 22 is switched to close pulse gate 13.

As seen in curve C of FIG. 1, the output signals transmitted from the output stage 11 comprise a first pulse 7 having a width equal to the time delay between the driving pulse 5a and the reception of the echo signals 9, followed by a plurality of constant width pulses having a time interval therebetween proportional to the time between the pulses in the received echo pulse group.

Referring to FIG. 3, an alternate embodiment of a bandwidth compression system in accordance with the principles of this invention is shown. The secondary information pulse is developed in a manner similar to that described in conjunction with the embodiment shown in FIG. 2; i.e., the transducer 5 emits a driving pulse 5a which activates a flip-flop 6 to couple a pulse 7 to the output stage 11 and the pulse 7 is cut off by the detection in the receiver 8 of the echo pulses 9 which are also coupled to the flip-flop 6 and thus the width of the pulse 7 is equal to the time delay between the transmission of the driving pulse and the reception of the echo returned from the wall of the oil well casing which is being sampled.

The clock pulses or switch control pulses are developed in a 5 mc. pulse generator 12 whose output is coupled to the pulse gate 13'. The pulse gate 13' is opened by the output of the AND circuit 14' responsive to the inverted pulse output 7a from the flip-flop circuit 6. Thus, the clock pulses at a 5 mc. rate are coupled through gate 13' to the switch 33 during that portion of the information cycle when pulse 7 is not being generated. The switch 33 may comprise a pair of 10-position beam switching tubes. The positions of the beam switching tubes forming the switch 33 are operated at the 5 mc. rate determined by the gate 13' and the output from switch 33 is coupled to each of the 20 AND circuits 34 in sequence. The received pulse group 9, which occurs during approximately 4 microseconds, is also coupled to the AND circuits 34. Since the 20 AND circuits 34 are switched in at the 5 mc. rate, the entire time period during which the echo pulses 9 are received is sampled and each pulse in the echo is coupled through the AND circuit 34 which corresponds to its portion in time in the received signal. The AND circuits 34 which sample a pulse from the echo signal 9 when they are activated by the output from the switch 33 couple a signal to the storage devices 35. The storage devices 35 may comprise simple capacitors. When the switch 33 completes its 20 position cycle, a signal is detected in the reverser circuit 22' whose output closes the AND circuit 14' causing the pulse gate 13' to close.

Simultaneously the output of the reverser 22' opens the AND circuit 23' which opens the pulse gate 24' and passes the clock pulses from the 25 kc. generator 25 to the second switch 36, which may also comprise a pair of ten positions beam switching tubes. The output of the switch 36 is coupled to the AND circuits 37 which sequentially interrogate the storage devices 35 at the 25 kc. rate determined by the pulse generator 25. When an interrogated storage device 35 indicates that a signal is stored therein, the AND circuit 37 causes the pulse gate 38 to be opened, coupling a 25 kc. pulse from the pulse gate 24' over line 30' to the output stage 11. When the switch 36 completes its cycle, a signal is coupled to the reverser 32' whose output closes the AND circuits 23' which in turn causes the pulse gate 24' to be closed. Since the storage devices or capacitors 35 are self-resetting, the next driving pulse merely clears the switches 33 and 36 by being coupled over line 39.

While the principles of this invention have been described above in connection with specific apparatus, it is to be clearly understood that this description is by way of example only and not as a limitation to the scope of this invention as set forth in the objects thereof and in the accompanying claims.

I claim:

1. A system for the transmission within a narrow frequency band of information derived from the transmission of a driving pulse and the reception of a group of echo pulses comprising means for initiating a first pulse responsive to the transmission of said driving pulse, means for terminating said first pulse responsive to the reception of said echo pulses and means for generating a pulse train responsive to said group of echo pulses, said pulse train having a spacing between pulses proportional to the spacing between echo pulses in said group and means for transmitting said first pulse and said pulse train in sequence.

2. A system according to claim 1 wherein said means for generating a pulse train includes means for time sampling the period during which said group of echo pulses are received, a plurality of storage devices each associated with one of said time samples, means for determining the presence of an echo pulse in one of said time samples, means for coupling an echo pulse present in one of said time samples to the associated storage device, means for sampling each of said storage devices during a period of time following the period of time during which said group of echo pulses are received, means for determining the presence of a stored pulse in said storage devices and means for generating a pulse train having a period between pulses indicative of which of the plurality of storage devices had a stored pulse present.

3. A bandwidth compression system for transmitting over a relatively narrow frequency band channel primary signal information including the time between pulses in an echo signal having a plurality of closely spaced pulses and secondary information including the time between the transmission of a driving pulse and the detection of said echo, comprising means for generating a first pulse having a width proportional to the time difference between said primary and secondary information, means to generate a plurality of pulses having a modulation characteristic proportional to the time difference between the pulses in said echo signal and means to couple in sequence said first pulse and said plurality of generated pulses as the output of said system.

4. A system according to claim 3 wherein the means to generate said plurality of pulses includes a source of pulses at a relatively high frequency, a plurality of storage devices, means to switch said high frequency pulses to each of said storage devices to activate said storage devices for storage in sequence, means to couple said primary signal information to said storage devices whereby each of the pulses in said echo signal is stored in one of said devices which is activated during the time period when said echo pulse is received, a source of pulses at a relatively low frequency, means to switch said low frequency pulses to each of said storage devices in sequence, means to generate a pulse responsive to the presence of a stored pulse and a low frequency pulse in each of said storage devices and means to couple said last mentioned generated pulses as a pulse train to the output of said system.

5. A system according to claim 4 wherein each of said means to switch includes at least one beam switching tube.

6. A system according to claim 5 which further includes means to couple the driving pulse to each of said beam switching tubes to clear said tubes.

7. A system according to claim 4 wherein said storage devices includes a capacitor.

8. A system according to claim 4 wherein each of said means to switch includes a binary counter.

9. A system according to claim 4 wherein each of said storage devices includes a bistable device.

10. A system according to claim 4 wherein each of said storage devices includes a flip-flop circuit.

11. A system for transmitting secondary information representing the time between the emission of a driving pulse and the reception of an echo signal composed of a plurality of closely spaced pulses and primary information representing the time separating said closely spaced pulses, said system comprising means for generating a first pulse having a pulse width equal to said secondary information, means to store said primary information, means to generate a group of pulses having a modulation characteristic proportional to said primary information and means to transmit said first pulse and said group of pulses in sequence in a period of time greater than the combined time occupied by said primary and secondary information.

12. A system according to claim 11 wherein said means to generate a first pulse includes a flip-flop circuit, said flip-flop circuit initiating a pulse responsive to the emission of said driving pulse and cutting off said initiated pulse responsive to the reception of said echo signal.

13. A system according to claim 11 wherein the modulation characteristic of said group of pulses comprises the time between pulses of constant width.

References Cited in the file of this patent

UNITED STATES PATENTS

| | | |
|---|---|---|
| 2,500,638 | Krauth | Mar. 14, 1950 |
| 2,537,056 | Hoeppner | Jan. 9, 1951 |
| 2,631,270 | Goble | Mar. 10, 1953 |
| 2,637,812 | Hagen | May 5, 1953 |
| 2,766,325 | Di Toro | Oct. 9, 1956 |
| 2,782,412 | Brockner | Feb. 19, 1957 |
| 2,864,081 | Steelman | Dec. 9, 1958 |
| 2,907,021 | Woods | Sept. 29, 1959 |
| 2,911,625 | Chien | Nov. 3, 1959 |
| 2,968,022 | Uterberger | Jan. 10, 1961 |
| 2,968,724 | Clark | Jan. 17, 1961 |
| 3,037,166 | Alexander | May 29, 1962 |

OTHER REFERENCES

Fundamentals of Digital Computers, by Matthew Mandl, Prentice-Hall, Inc., 1958, QA 76.5 M3 C.2, pp. 95, 96 relied on.